United States Patent
Halahan et al.

(10) Patent No.: US 9,986,696 B2
(45) Date of Patent: Jun. 5, 2018

(54) IRRIGATION SMART CONTROLLERS WITH PROGRAMMING AND FIRMWARE UPDATING

(71) Applicant: ET Water Systems, Inc., Novato, CA (US)

(72) Inventors: Patrick B. Halahan, Santa Rosa, CA (US); Peter Bice, Sebastopol, CA (US); Mark Elliot, Santa Rosa, CA (US)

(73) Assignee: ET Water Systems, Inc., Novato, CA (US)

( * ) Notice: Subject to any disclaimer, the term of this patent is extended or adjusted under 35 U.S.C. 154(b) by 631 days.

(21) Appl. No.: 14/469,494

(22) Filed: Aug. 26, 2014

(65) Prior Publication Data

US 2015/0057818 A1 Feb. 26, 2015

Related U.S. Application Data

(60) Provisional application No. 61/870,126, filed on Aug. 26, 2013.

(51) Int. Cl.
*A01G 25/16* (2006.01)
*G05B 15/02* (2006.01)

(52) U.S. Cl.
CPC .............. *A01G 25/16* (2013.01); *G05B 15/02* (2013.01); *G05B 2219/2642* (2013.01)

(58) Field of Classification Search
None
See application file for complete search history.

(56) References Cited

U.S. PATENT DOCUMENTS

| | | | | |
|---|---|---|---|---|
| 2002/0078142 A1* | 6/2002 | Moore | ............... | G06F 8/68 709/203 |
| 2002/0138592 A1* | 9/2002 | Toft | ............... | H04N 21/8173 709/219 |
| 2005/0090915 A1* | 4/2005 | Geiwitz | ............... | G05B 15/02 700/90 |
| 2006/0025875 A1* | 2/2006 | Smith | ............... | G05B 19/0426 700/86 |
| 2006/0112422 A1* | 5/2006 | Tevosyan | ............... | H04L 63/0807 726/9 |
| 2008/0027587 A1* | 1/2008 | Nickerson | ............... | A01G 25/16 700/284 |
| 2011/0055297 A1* | 3/2011 | Maeda | ............... | G06F 3/0613 707/824 |
| 2014/0316581 A1* | 10/2014 | Fadell | ............... | F24F 11/0009 700/276 |

* cited by examiner

*Primary Examiner* — Tuan Dao
(74) *Attorney, Agent, or Firm* — Perkins Coie LLP

(57) ABSTRACT

Embodiments of the present disclosure include systems and methods for downloading and installing software updates upon an irrigation control unit (ICU). Some of the disclosed embodiments include error checking and integrity verification procedures which help ensure that the new software is properly installed. In some embodiments the update is coordinated in conjunction with the ICU's regular contact with a control server.

11 Claims, 16 Drawing Sheets

FIG. 14

| ID Value | State Name | Web Status | Description |
|---|---|---|---|
| 0 | uninitialized | Not shown | Not used. The value of status when it is uninitialized. |
| 1 | start_update | Start of update | The ETwater Administrator set up a firmware update for this ICU. No progress is made yet for this download. |
| 2 | icu_scheduled | ICU is scheduled | The ICU has called into the ICU Server and received the time to call the OTAP Server and the IP address information of the OTAP server. |
| 3 | otap_called | Start of update | The ICU has called the OTAP server and is very likely in the process of downloading the new firmware. |
| 4 | partial_update | Partial Update | The ICU downloaded some but not all of the firmware. Communications was interrupted and the ICU must call in again at the "minute to call" time. |
| 5 | full_update | Update Loaded | The ICU has uploaded the complete firmware but it has not yet rebooted and reported into the ICU server. |
| 6 | rebooted | ICU rebooted | The ICU has rebooted after downloading the firmware. If no errors occurred the new software is running. Otherwise, the old software is chosen. |

IRRIGATION SMART CONTROLLERS WITH PROGRAMMING AND FIRMWARE UPDATING

CROSS-REFERENCE TO RELATED APPLICATION(S) AND PRIORITY DATE

This application is entitled to the benefit and/or right of priority under 35 U.S.C § 119(e) to U.S. Provisional Application 61/870,126 titled, "IRRIGATION SMART CONTROLLERS WITH PROGRAMMING AND FIRMWARE UPDATING," filed Aug. 26, 2013, which is hereby incorporated by reference in its entirety for all purposes. This application is therefore entitled to a priority date of Aug. 26, 2013.

FIELD OF THE INVENTION

Various of the disclosed embodiments relate to irrigation smart controllers as well as systems and methods for updating an irrigation smart controller's firmware and/or software.

BACKGROUND

Automated irrigation has many applications, such as gardening, farming, and general lawn care. However, the convenience of these automated systems is often impeded by their need for human intervention and direction. This may be especially problematic as the automated tools may be installed in remote locations with little or no ready physical access. Manually correcting and/or adjusting such components greatly diminishes the time-saving function they were intended to serve.

Where sophisticated algorithms control the behavior of the controller, the situation may be particularly problematic. Such controllers may require software updates on a regular basis to reflect adjustments, improvements, and additional functionality desired by users. Requiring that a user or technician travel to the physical device and install the new software is tedious and undesirable. However, updating the software automatically by remote communication presents its own unique challenges. Many controllers are operating in damp, outdoor environments, hostile to electronics, and implement low-cost, efficient components that may possess limited memory and processing capabilities. A remote update attempt which fails may render the controller inoperable, again frustrating the user's expectations and requiring the user to travel to the physical location of the controller to correct the situation.

Accordingly, there exists a need for an automated software system that can consistently and reliably perform updates to the onboard software of an irrigation controller. Such a system would ideally minimize human intervention and fulfill the controller's promise of a more automated and dependable irrigation service.

BRIEF DESCRIPTION OF THE DRAWINGS

One or more embodiments of the present disclosure are illustrated by way of example and not limitation in the figures of the accompanying drawings, in which like references indicate similar elements.

FIG. 14 is a screenshot of a graphical user interface for monitoring firmware update status at an OTAP server as may be implemented in some embodiments.

FIG. 15 is a table depicting example OTAP status indicator relations as may be implemented in some embodiments.

Figure 1:
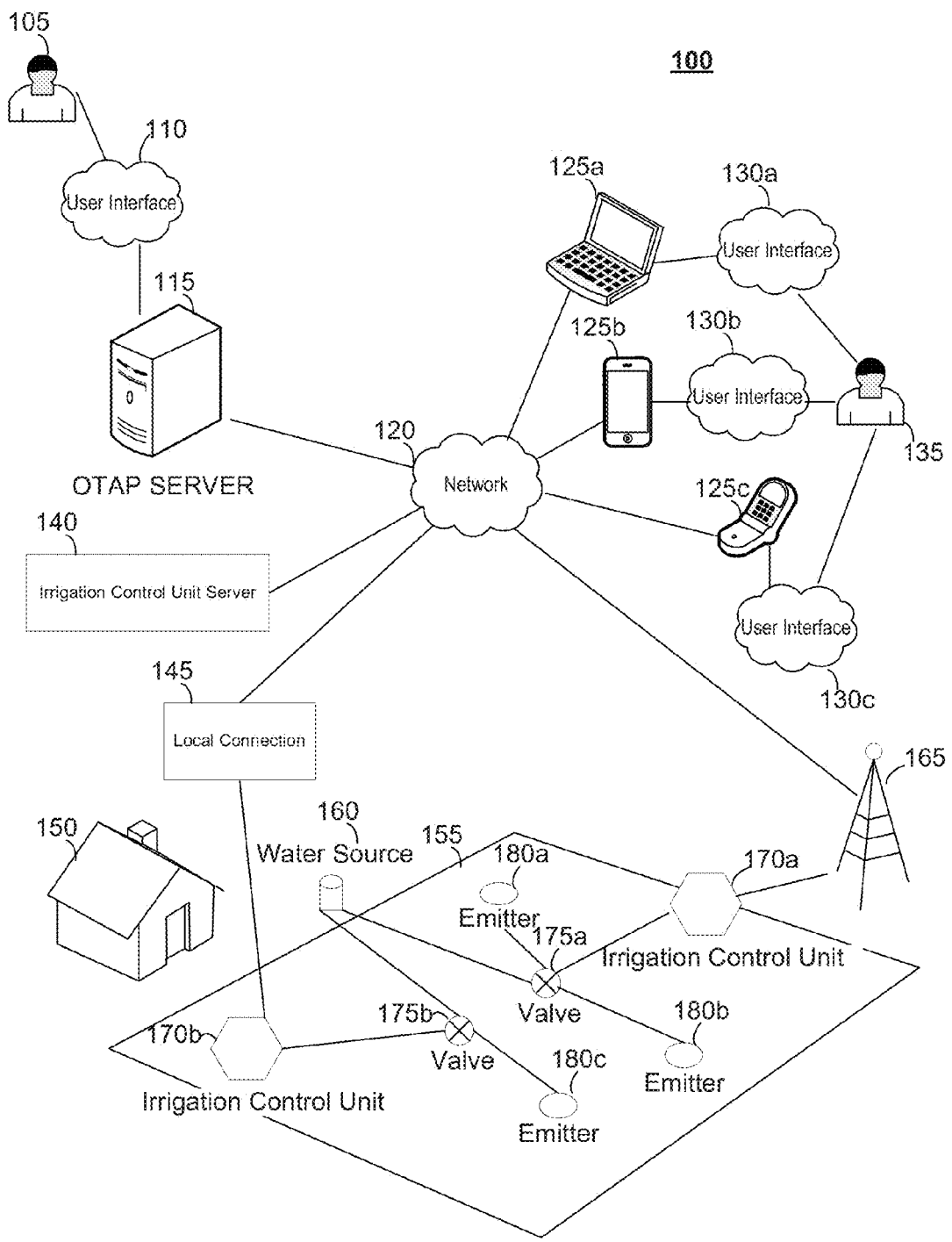
FIG. 1 illustrates a topology for managing an automated irrigation system as contemplated in some embodiments.

Those skilled in the art will appreciate that the logic and process steps illustrated in the various flow diagrams discussed below, may be altered in a variety of ways. For example, the order of the logic may be rearranged, substeps may be performed in parallel, illustrated logic may be omitted, other logic may be included, etc. One will recognize that certain steps may be consolidated into a single step and that actions represented by a single step may be alternatively represented as a collection of substeps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed and/or encrypted; etc.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Though the terms "software" and "firmware" may be referred to in isolation, one will recognize that the same systems and techniques disclosed herein may readily be applied to each interchangeably.

System Topology Overview

Various of the disclosed embodiments relate to irrigation smart controllers as well as systems and methods for updating the controller's firmware and/or software.

FIG. 1 illustrates a topology 100 for managing an automated irrigation system as contemplated in some embodiments. As indicated, property 150 may include an outdoor region 155, such as a lawn, garden, crop field, cattle pasture, etc., requiring watering. Water may be distributed from a central water source 160 via a plurality of emitters 180a-c. Emitters 180a-c may comprise "sprinklers", hoses, pop-up heads, impact rotors, etc. which distribute water over a local area. In some embodiments, the emitters may be actuated via water pressure. In some embodiments, the emitters may be actuated by a voltage, e.g. 24V. The water pressure and direction may be controlled by a plurality of valves 175a-b, which may themselves be actuated by pressure or by voltage in different instances depending upon the manufacturer. Valves 175a-b may be in electrical or fluid communication with irrigation control units (ICUs) 170a-b. ICUs 170a-b may include computer systems which interface with, or include, an actuator control system to actuate valves 175a-b, or in some instances, to directly actuate emitters 180a-c. Valves 175a-b, emitters 180a-c, and/or other mechanical devices for distribution water may each be referred to herein as a water distribution element.

ICUs 170a-b may be in communication with a network 120, e.g., the Internet, via a variety of means. In some embodiments, the ICUs 170a-b may communicate via a local connection 145, such as a hard-line Ethernet connection, a Wi-Fi wireless access point, etc. In some embodiments, the ICUs 170a-b may communicate via a cellular connection with a cellular tower 165. In these embodiments, the ICUs may mimic, or use the same equipment, as cellular phones to communicate via the cellular tower. Accordingly, the ICU may be able to communicate via a data channel and a Short-Messaging-System channel (SMS) in these systems. In some embodiments, an ICU may be able to initiate data and SMS communication via the cellular tower 165, but the cellular tower 165 may be able to initiate only SMS, but not data, communication with the ICU 170a. This may be a consequence of the design of the cellular architecture. One will readily recognize other communication means (e.g., satellite-based communications).

Via one or more of these communication links to network 120, the ICUs 170a-b, may communicate with an Irrigation Control Unit server 140 and/or an Over-the-Air-Programming (OTAP) server 115. One will recognize that these names are arbitrary and that servers 140 and 115, may be the same server in some embodiments, different virtual machines on a single machine, completely separate server systems, etc. The designation "Irrigation Control Unit" indicates the day-to-day monitoring and operational functions performed by a server, whereas the "OTAP" designation indicates the programming and software update functions on the server. An interface 110 may be used by an administrator or technician 105 to specify when and what nature of software and firmware updates are to be performed on the ICUs 170a-b. In some embodiments, the administrator or technician 105 may communicate with the OTAP server 115 via a personal computer or mobile device. For example, the administrator or technician 105 may create software locally and then upload an update to the server 115 via a website provided by the server 115. In some embodiments, the OTAP server notifies the ICU server which in turn tells the ICU when and how to call in for an upgrade. The ICU may call the ICU server after an upgrade, identifying its firmware version, to indicate the success or failure of the process.

A user 135, possibly the owner or gardener of property 150, may manage the operation of the ICUs 170a-b via a user interface 130a-c on a computing device 125a-c which, as depicted, may take any suitable form. User 135 may specify irrigation schedules, quantities, character, activation times, etc. This information may be communicated to the irrigation control unit server 140. Either via periodic updates, requests from the ICUs 170a-b, or at the server's initiative, the server may then communicate this information to the ICUs 170a-b to adjust their operation accordingly.

In some embodiments, the OTAP server may provide field firmware upgrades without requiring technician, factory, or customer intervention. The new firmware may be downloaded, verified, burned into flash memory, and the processor restarted automatically. Error codes on the ICU may be used to identify failures. These codes may be transferred to the server (either the OTAP or ICUS) at the next logon event. Partial downloads may occur in some embodiments, e.g., failure midway through a download. A scheduled watering event may also stop a download until it can be resumed at a later time.

In some embodiments, the OTAP operation on the ICU will be generally invisible to the customer. For example, the ICU display may announce what is happening if anyone is looking at it, but otherwise most customers may be unaware of their upgrade.

Example Irrigation Control Unit Components

Figure 2:
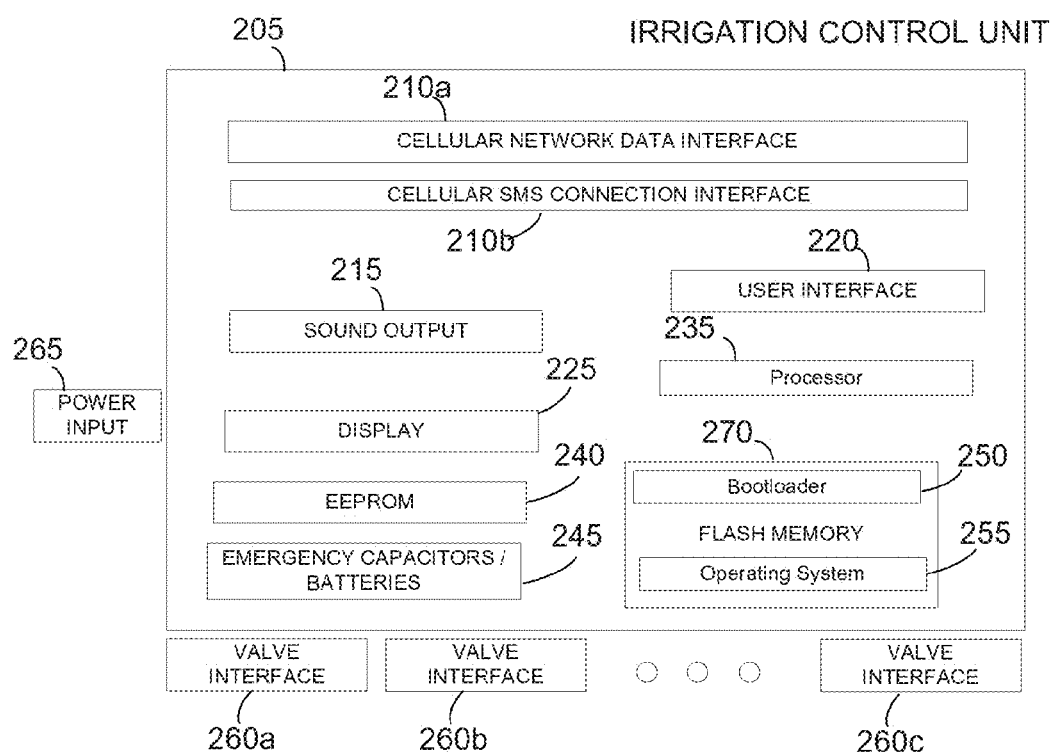
FIG. 2 is a block diagram of some components that may be present in an Irrigation Control Unit (ICU) as contemplated in some embodiments.

FIG. 2 is a block diagram of some components that may be present in an Irrigation Control Unit (ICU) 205 as contemplated in some embodiments. As mentioned, the unit may communicate with a cellular tower via a cellular network data interface 210a or a cellular SMS connection interface 210b. These interfaces may be embodied in the same physical device (e.g., a machine-to-machine interface as provided by Numerex®). In some embodiments, a sound output 215 may be included to inform a user of the ICU's operation when the user is physically present (e.g., modem clicks and confirmation beeps). A user interface 220 may also provide direct physical user control of the ICU and a display 225 may further indicate the ICU's status and behavior.

A plurality of valve or emitter actuation interfaces 260a-c may be in communication with the ICU, e.g. as an attached peripheral. Where the valves are electrically controlled, the interfaces 260a-c may output, e.g., 24V on a control line connected to each of their respective actuation devices.

A power unit 265 may receive power from an external source, e.g., a solar cell, a 120V power outlet, etc. This incoming power may be converted to a form suitable for actuation of the valves and emitters. Emergency capacitors or batteries 245 may be used to maintain the operation of the ICU when power becomes unavailable from input 265. For example, the ICU may run on this internal power while notifying a user that the unit is in need of technical service. Capacitors or batteries 245 may also be used to store energy for night operation when solar cells are used.

One or more processors 235 may be used to perform operations on the ICU. The processor 235 may be in communication with a memory, e.g. a flash memory 270, though one will recognize alternative suitable memories for similar purposes. A separate memory, e.g. an EEPROM 240, may also be included, which may provide more secure storage, or more stable storage, than memory 270. Memory 270, may include a bootloader 250 partition for loading an operating system 255 upon ICU initiation, e.g., following a restart.

Example Information Exchange

Figure 3:
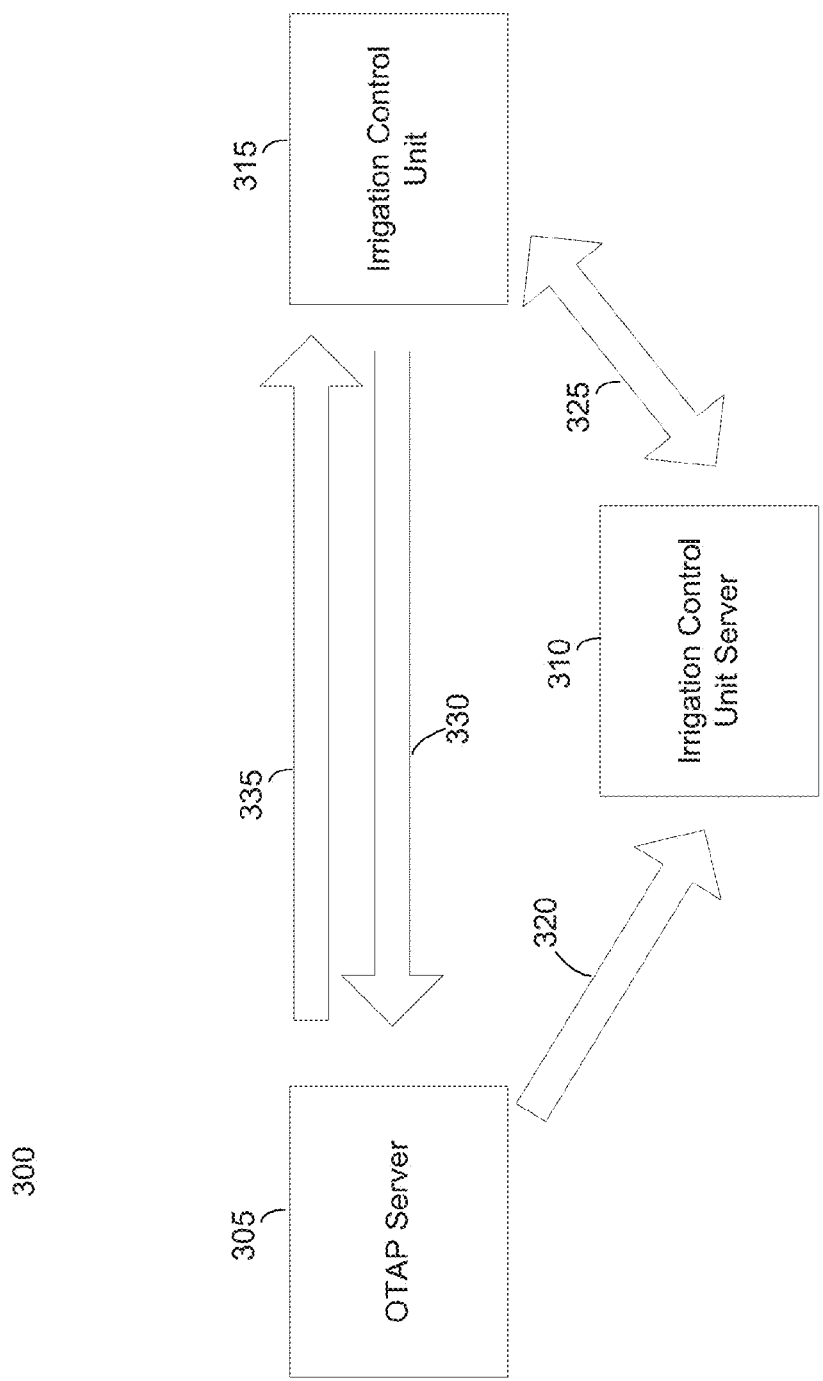
FIG. 3 is a block diagram depicting communication connections between an Over the Air Programming (OTAP) server, Irrigation Control Unit Server (ICUS), and an ICU for negotiating and performing a firmware or software update, as contemplated in some embodiments.

FIG. 3 is a block diagram depicting communication connections between an Over the Air Programming (OTAP) server 305, Irrigation Control Unit Server (ICUS) 310, and an Irrigation Control Unit (ICU) 315, as contemplated in some embodiments.

An ICUS 310 may be in regular communication 325 with an ICU 315. As discussed above, the ICU 315 may periodically check in with ICUS 310 and may receive watering scheduling information from ICUS 310. Following creation of a software update on OTAP server 305, the server 305, may communicate 320 the update to ICUS 310 (where OTAP server 305 and ICUS 310 are the same server, the server may instead make a record to update the ICU). Upon a subsequent update between ICU 315 and ICUS 310, the ICUS 310 may notify the ICU that an update is available from OTAP server 305 and possibly a time at which to contact OTAP server 305 and other pertinent connection information. Accordingly, the ICU 315 may subsequently contact 330 the OTAP server 305 and receive 335 the software update. ICU 315 may establish a cellular data connection with the OTAP server. Because, in some embodiments, a data connection can only be established from the ICU 315, in some embodiments the OTAP server 305 or the ICUS 310 may send an SMS message to the ICU 315. The ICU 315 may read the message and generate a data connection in response. The software update may include a portion of an operating system or an entirely new operating system.

In some embodiments, the ICU may have communicated with the ICU Server and received an appropriate minute of day to call, IP address of the OTAP Server, and the UDP port to use for the OTAP server. In some embodiments, database records area created for the OTAP Server's benefit. For example, an entry may contain the appropriate OTAP server information and another entry configured for the specific firmware download information. Firmware may be uploaded and available for download in the OTAP Server and a corresponding record in a database created. In some embodiments, any database configuration may be done by hand or script. As discussed herein, the database may include information in SQL, XML, JSON, etc. form.

Processes

Processes—Exchange Processes Overview

Figure 4:
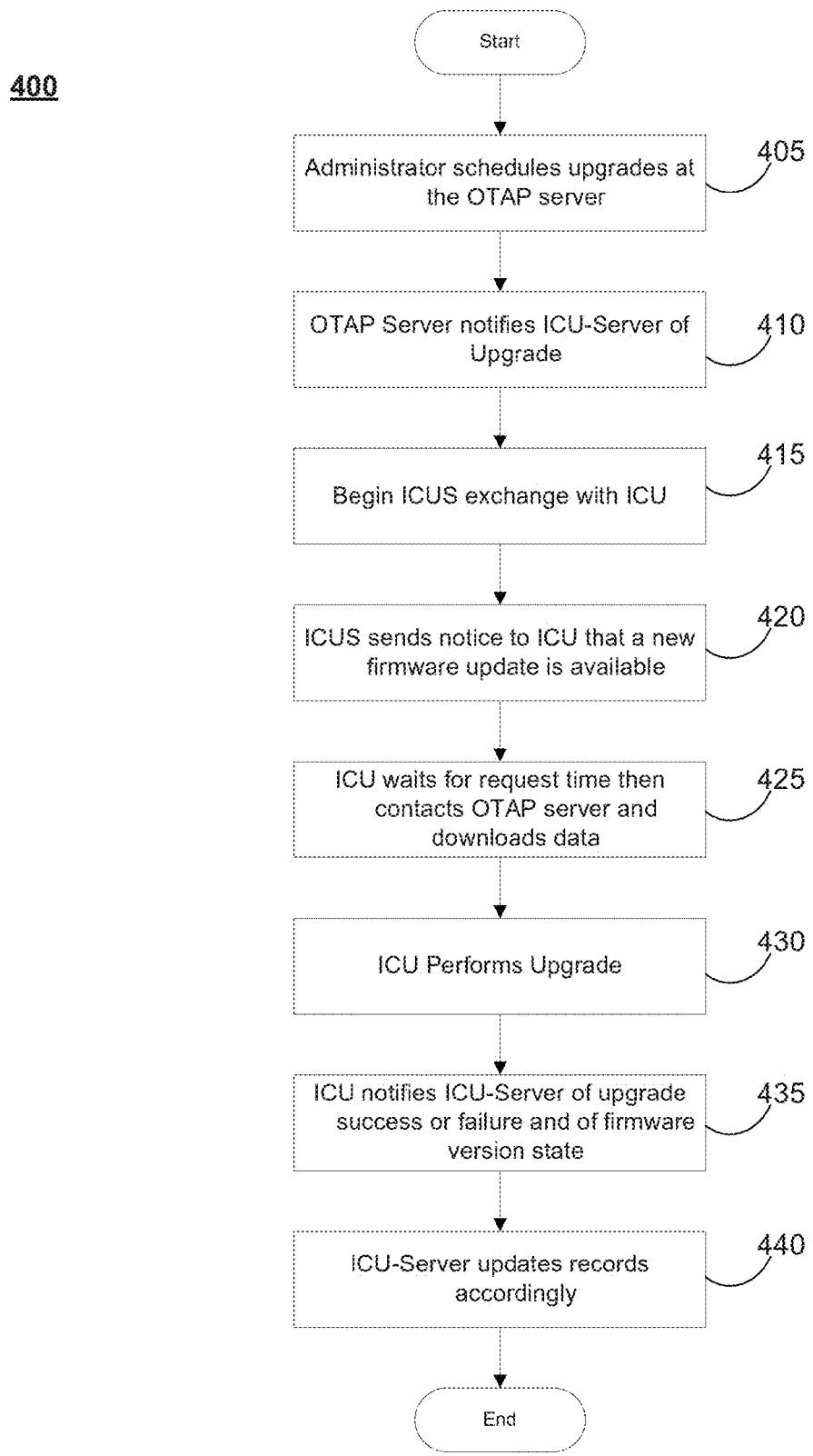
FIG. 4 is a flow diagram depicting certain steps as may occur in an ICU-OTAP server exchange process as may be implemented in some embodiments.

FIG. 4 is a flow diagram depicting certain steps as may occur in an ICU-server exchange process as may be implemented in some embodiments.

At block 405, an administrator may schedule one or more software/firmware upgrades at the OTAP server.

At block 410, the OTAP server may notify the ICUS that the upgrade is available.

At block 415, the ICUS may begin an exchange with the ICU, e.g., as part of a periodic update. As discussed above, the exchange may be initiated via a cellular data connection, an SMS connection, or a combination of SMS and data connections.

At block 420, during the exchange, the ICUS may send a notice to the ICU that a new firmware or software update is available. This notice may include a time-of-day to call, as well as an Internet Protocol address and a port to use.

At block 425, the ICU may wait until a designated request time and may then contact the OTAP server and request the download. In some embodiments, the OTAP Server may instead contact the ICU via an SMS message.

At block 430, the ICU may perform the software upgrade locally. In some embodiments the upgrade is performed as blocks of software are streamed from the OTAP server as described in greater detail below.

At block 435, the ICU may notify the ICU-server of an update success or failure and state of the firmware/software on the device.

At block 440, the ICU-server may update its records accordingly.

Processes—Upgrade Download and Installation

Figure 5:
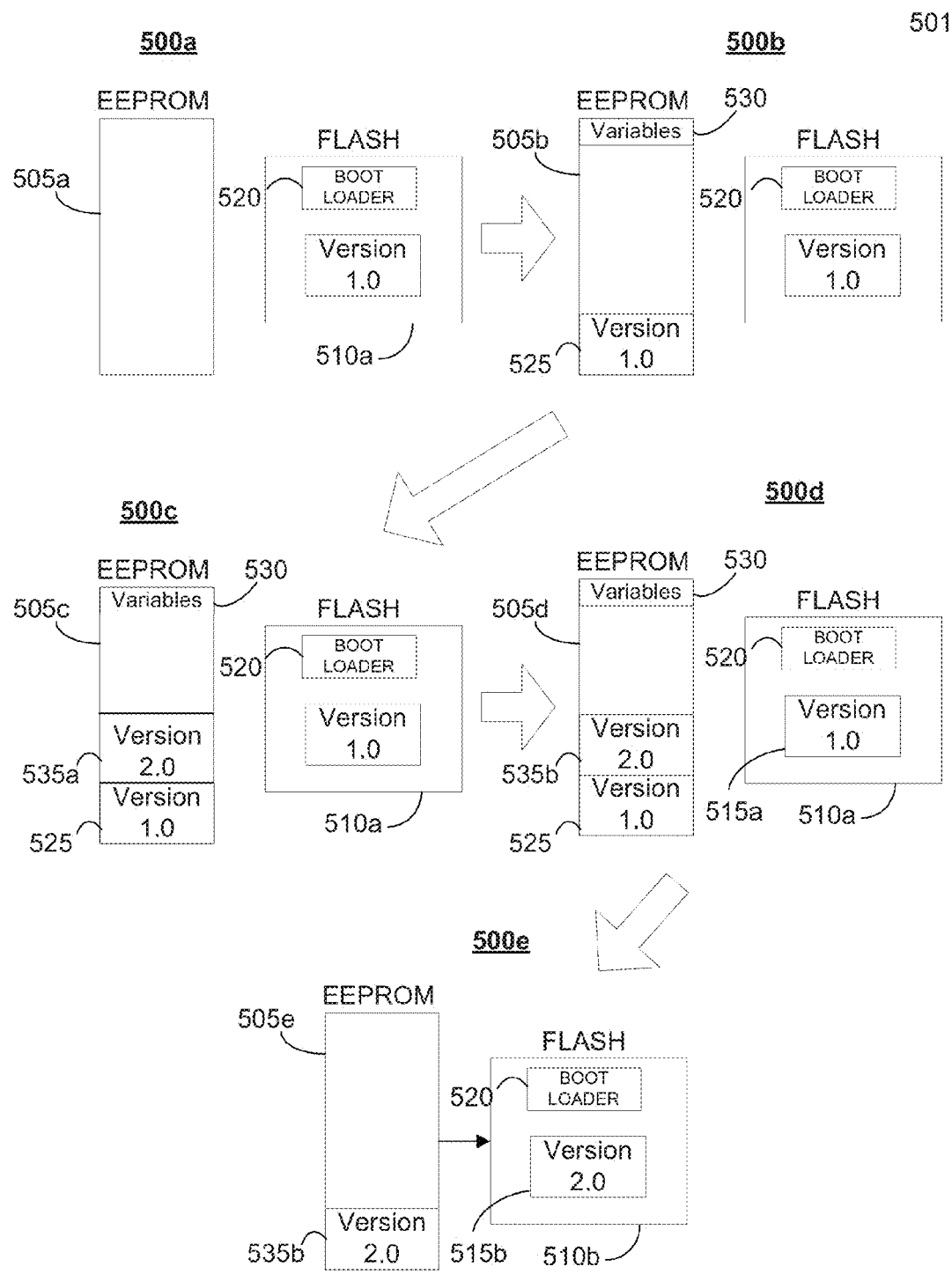
FIG. 5 is a state diagram depicting states of an EEPROM and FLASH memory as may occur during a software update process in some embodiments.

FIG. 5 is a state diagram depicting states 500a-e of an EEPROM and FLASH memory in an ICU as may occur during a software update process in some embodiments.

At state 500a, a firmware or software version 1.0 515a may be operating on a flash memory 510a within the ICU. In this example, the software may be operating system software for the ICU. Following notification that a software update is available the ICU may transition to state 500b.

At state 500b, the system may take some preparatory actions before beginning the update download. For example, the system may store variables 530 in the EEPROM 505b specifying certain parameters and operating preferences previously specified by a user, as well as certain system information. The system may also store a copy 525 of the current software version. In the event the download fails, the system may revert to the old installation by reference to variables 530 and version copy 525. Once preparations are complete, the system may transition to state 500c.

At state 500c, the system may begin receiving blocks of data from the OTAP server. These blocks may be checked for errors as described in greater detail below and transferred to EEPROM 505c for temporary storage as an incomplete copy 535a of the new version. This process may continue until a complete copy of the new version (Version 2.0) 535b is available at state 500d.

At state 500d, the system may have a complete copy 535b of the new software. At this point the system may have configured boot loader 520 to load the new copy of the software from the EEPROM 505d following a reboot of the ICU. Accordingly, before, or following, the reboot the system may replace the current version 515a in the flash memory 510b with the new version 515b. The boot loader 520 and/or the new software version 515b may reference the variables 530 stored in EEPROM 505d to configured the new installation in accordance with the previous configuration.

At state 500e, the system may remove the copy of the old software version from the EEPROM 505e, but retain the copy of the current software version 535b. In this manner, when a new version update appears, the system may retain the existing copy of the current version for backup purposes. In this example the variables 530 have also been removed, though one will recognize that in some embodiments they may be retained and modified/overwritten during a subsequent update if there are new values.

Processes—Error Correction During Upgrade Download and Installation

Figure 6:
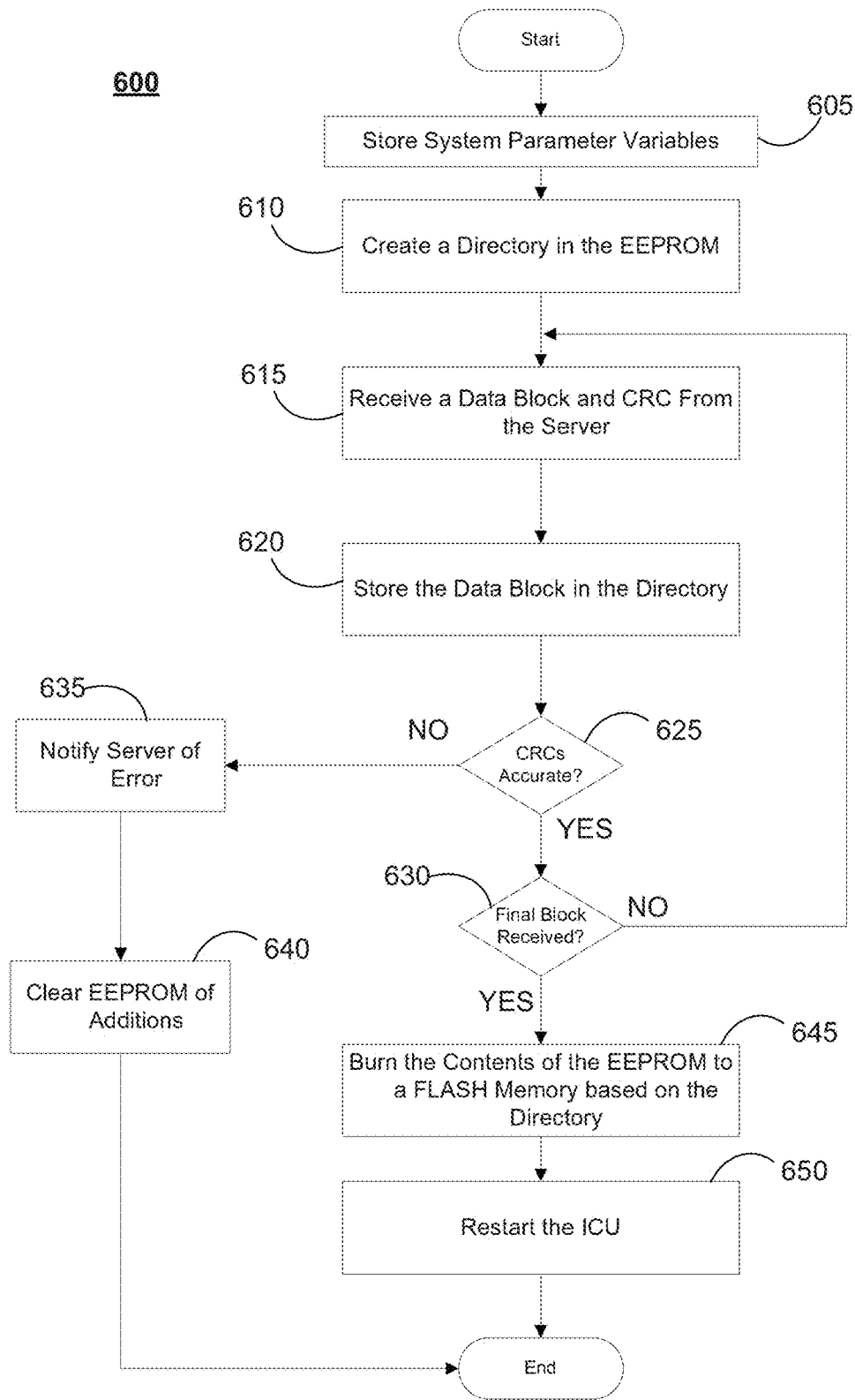
FIG. 6 is a flow diagram depicting certain steps as may occur in a firmware update process as may be implemented in some embodiments.

FIG. 6 is a flow diagram depicting certain steps as may occur in a firmware update process as may be implemented in some embodiments.

At block 605, the system may store system parameter variables, e.g., the variables 530 to the EEPROM.

At block 610, the ICU may create a directory in the EEPROM for storing the incoming blocks. For example, the directory may be a plurality of storage locations in the EEPROM allocated for receiving the incoming blocks of data.

At block 615, the ICU may receive a data block and corresponding cyclic redundancy check (CRC) from the server or other suitable error detection code. In some embodiments the ICU may download a series of, e.g., 350-byte blocks of hex-ASCII data representing the download. Each block may be checked for non-conforming characters and the data may be stored in sequential EEPROM bytes as described herein. In some embodiments, the download may be exactly the file generated by the compiler, and may consist of the following characters: "@<hexadecimal address>" directives referring to start address in the ICU memory space of a section of code; hexadecimal byte values of contiguous bytes separated by spaces or <CR><LF>; the letter "q" indicating end-of-file; and a hexadecimal CRC at the end, generated by the server from the preceding bytes. Everything download may be human-readable in some embodiments.

At block 620, the system may store the data block in the directory. Hexadecimal byte values may be stored sequentially in the EEPROM as binary bytes, in the order that they are received. The directory may have two address entries for each disjointed section of code, consisting of the beginning of the section in the EEPROM and the beginning of the section in the ICU. A running count of the number of sections may also be stored in the EEPROM. As bytes are stored in the directory and in the body of the download binary code, separate CRCs (distinct from those provided by the OTAP server) may be generated. These CRCs may later used to verify that the writes to the EEPROM were correct.

At block 625, the system may determine if the CRCs are consistent and indicate that the block is properly stored. In some embodiments, when the block download is complete the CRC received from the server may be compared to one internally generated as the data was received. If the codes differ the process may be abandoned, an event may be stored (for delivery to the OTAP server or ICUS), and the original operating code may be resumed. Otherwise, separate CRCs may be generated from the EEPROM's directory and binary code body and compared with the CRCs generated when the EEPROM was written. Again, as indicated below, if the codes differ the process may be abandoned, an event may be stored, and the original operating code may be resumed.

In some embodiments, the code "family" is the final check. Each ICU may have a 32-bit family code that is at a fixed location in the ICU and in the download image. In some embodiments, these two family codes must match or else an error is presumed—e.g., the wrong code set is being sent. A family mismatch may cause the process to be announced and abandoned.

If the block was not properly saved, at block 635 the system may notify the server of the error. At block 640, the system may clear the EEPROM of the additions (the blocks of the new software version, directory, and variable parameters). The system may reattempt the download at a subsequent time in some embodiments. In some embodiments the download may also be aborted if a scheduled watering event occurs during the download.

If at block 625 it was instead determined that the data block was properly saved, then the system may continue to receive, store, and verify blocks at block 630 until the final block has been received and processed.

After the final bock is received and processed, then at block 645 the system may burn the contents of the EEPROM to the flash memory based upon the directory and may restart the ICU at block 650. Following download of all the blocks, a valid code image may be presumed to be in the EEPROM. The reprogramming cycle may then begin. Before doing so in some embodiments, certain configuration data may first be saved, for retrieval "on the other side." Data such as the type of master valve, the host type, the rain sensor type if any, and flow sensor debounce microseconds (e.g., to account for non-theoretical mechanical effects) may be saved in the EEPROM.

In some embodiments, a small area of boot code in the ICU is "protected". This area may be maintained through OTAP versions and may not change between code revisions. In some embodiments, it is self-contained, with all operating code needed to interpret the EEPROM directory, to burn the EEPROM contents into the ICU flash memory according to the directory, and to restart the system with the new code. It may have only one entry point at a consistent location. In some embodiments, the 32-bit family ID is in this protected area, also at fixed location.

In some embodiments, after the download is complete and all checks are satisfied, the ICU control transfers to this protected code. First, interrupts are disabled to prevent unexpected events trying to execute code outside the protected area. Then all unprotected code may be erased. Next, the EEPROM data may be programmed into the ICU flash memory according to the directory. In some embodiments, any data that the directory may place in the protected area may be skipped. After all data has been programmed a code violation may be performed, automatically restarting the microprocessor and initiating operation with the new code.

On restart the ICU may look for OTAP reconfiguration data in the EEPROM. If it is found, it may be installed and then erased from the EEPROM. In some embodiments, there is no watering program installed at this point. A normal restart like this may cause a call to be placed to the server at the default IP address and port, announcing a successful OTAP and loading a watering schedule.

Processes—Download Integrity Guarantee

Figure 7:
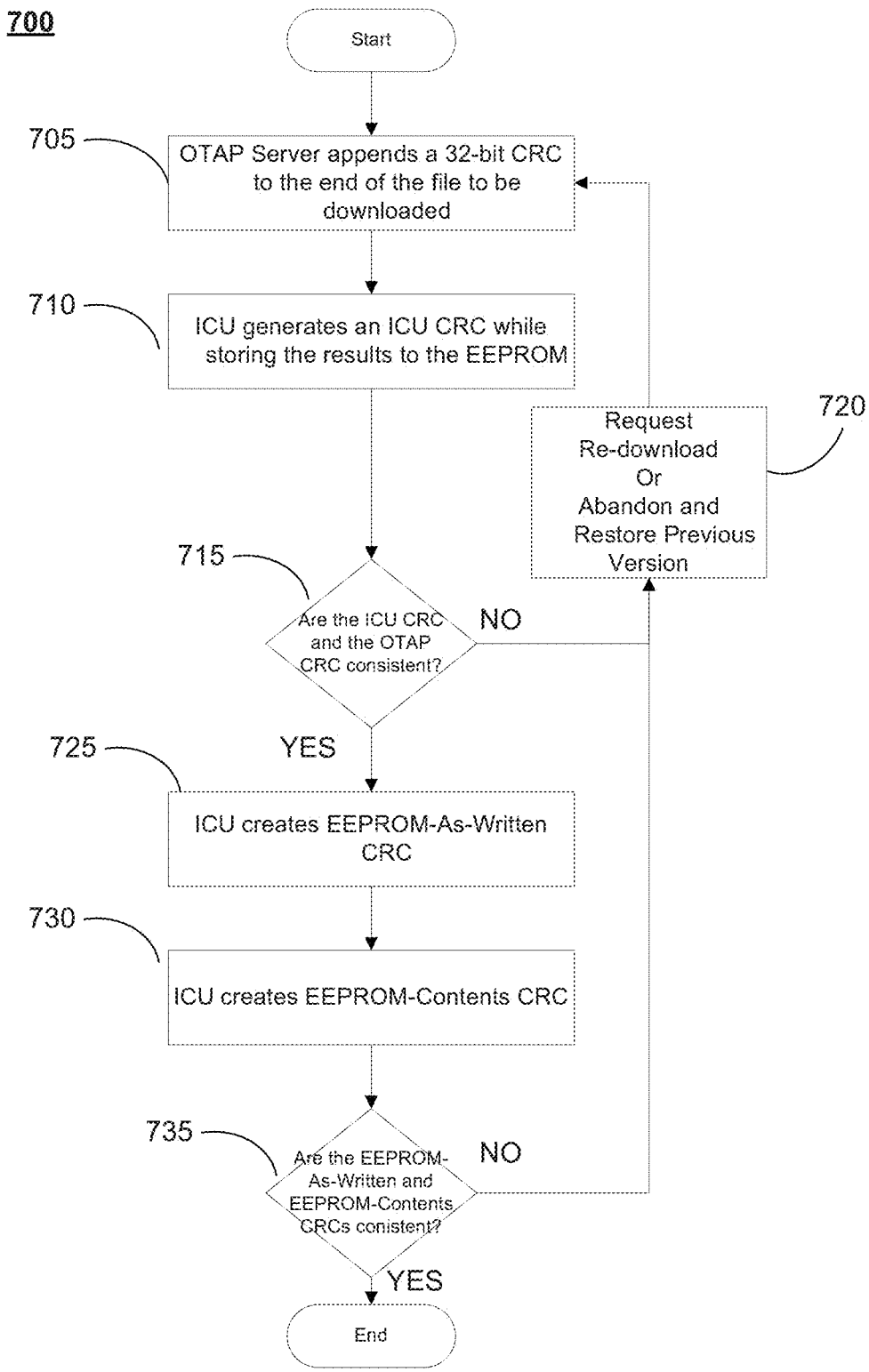
FIG. 7 is a flow diagram depicting certain steps as may occur in a download integrity guarantee process as may be implemented in some embodiments.

FIG. 7 is a flow diagram depicting certain steps as may occur in a download integrity guarantee process 700 in some embodiments.

At block 705, the OTAP server may append a CRC to the end of a file to be downloaded (in addition to the block-by-block CRCs).

At block 710, the ICU may generate a second ICU CRC while storing the results to the EEPROM.

At block 715, the ICU may determine not only whether the OTAP CRC and ICU CRC indicate no errors in the files, but also that the two CRCs match. If the CRCs do not match, or indicate errors, then the ICU may request a re-download of the new file at block 720 or abandon the download and revert to the previous version of the file.

If instead the CRCs check out, then at block 725, the ICU may create an EEPROM-As-Written CRC and an EEPROM-Contents CRC at block 730. At block 735, the system may determine if the EEPROM-As-Written CRC and an EEPROM-Contents CRC are consistent. If so, the process may end, or may otherwise seek corrective action.

In some embodiments, the EEPROM is a 2-megabit EEPROM with enough room to store the data for the entire download code image. As discussed, the firmware may be downloaded as an ASCII text file, e.g., exactly as generated by the compiler. Only hex digits, plus certain printable control characters, carriage return and line feed, may be expected. Any other unrecognized character may be rejected, an event is generated, and the download is stopped.

As discussed above, the OTAP server may append a 32-bit CRC to the end of the file to be downloaded. The ICU may also generate its own CRC while receiving the characters and storing the resulting bytes in EEPROM. If, at the end of the download process, the two CRCs disagree, an event is generated and the download is abandoned.

While the ICU may receive ASCII characters, it may store binary bytes representing operating code in the EEPROM. In the process of generating these bytes it may create another CRC representing the actual EEPROM contents. As a final check, a separate CRC may be generated from the contents of the EEPROM. If the two CRCs agree, the EEPROM may be assumed to be properly programmed. A similar CRC may be created and checked for only the EEPROM directory.

Processes—Download Failure Management

Figure 8:
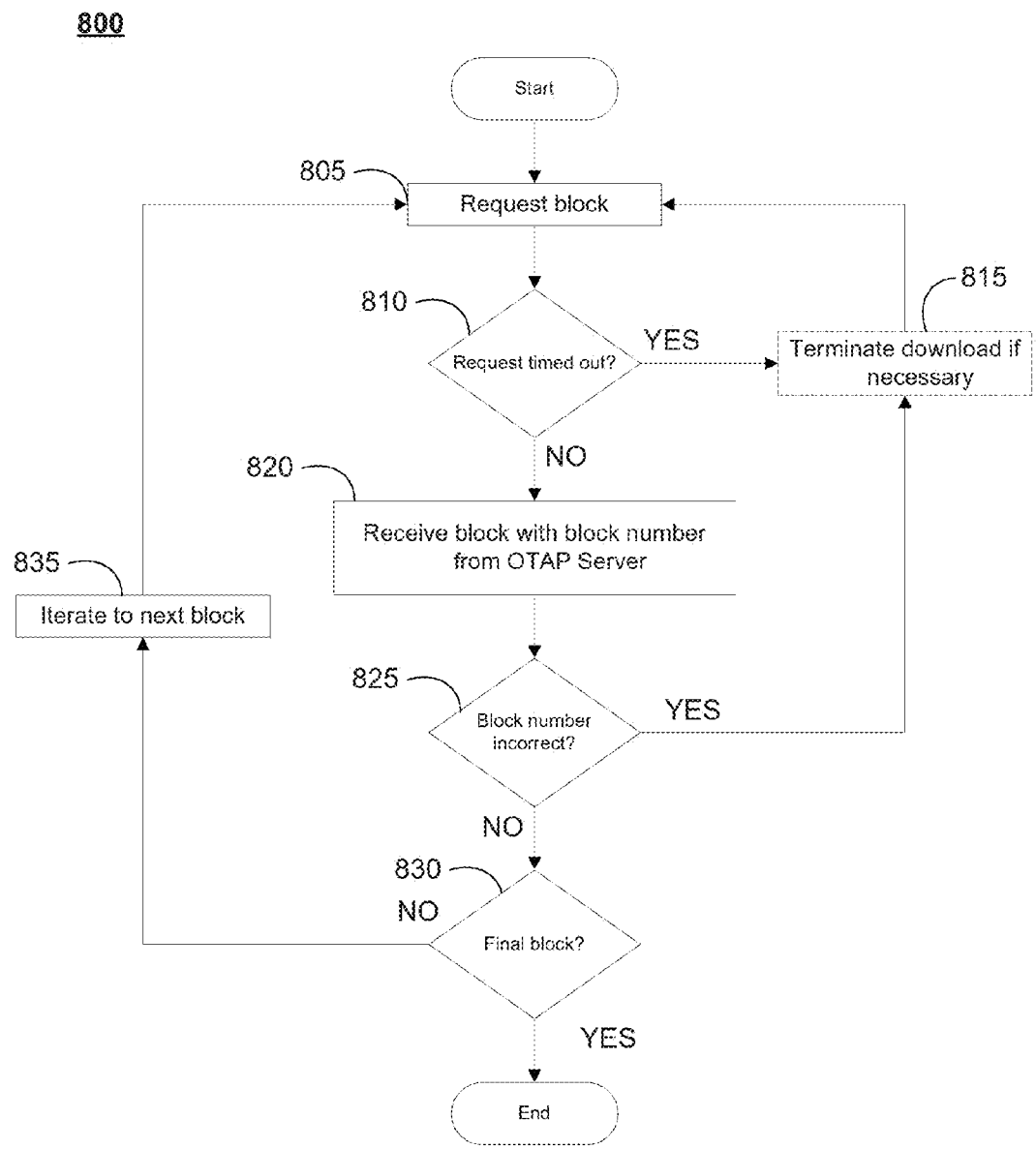
FIG. 8 is a flow diagram depicting certain steps as may occur in a download failure management process in some embodiments.

FIG. 8 is a flow diagram depicting certain steps as may occur in a download failure management process in some embodiments. In some embodiments, the ICU may send a two-byte block number as a request to the OTAP server. The OTAP server may then send that block to the ICU, whereupon the next block number may be issued by the ICU. In some embodiments, either participant can send a block number 0xFFFF which may terminate the download. In some embodiments, the block's contents may be printable ASCII while the block code is a binary number.

At block 805, the ICU may request another block of a file from the OTAP server.

At block 810, the ICU may determine whether the request for the block timed out. If so, the ICU may terminate the download at block 815 and take corrective action. In some embodiments, the ICU may instead request that the block be sent again.

After the ICU receives the data block at block 820, then at block 825 the ICU may determine whether the block number is correct. If not, corrective action may again be taken at block 815. This check may be in addition to the CRC checks discussed above.

If the block number is correct, and this is not determined to be the final block at block 830 then the system may iterate to the next block number 835 and begin a new block request. If this is the final block, the process may end.

There are many reasons a block may fail to be delivered. In some embodiments the data connection may be via a User Data Protocol (UDP) rather than a Transmission Control Protocol (TCP), and packets containing one or more blocks may expect to be lost. The block may be delayed or the request or the reply may simply be lost in transit. In some embodiments, if the ICU does not see a reply in five seconds, it may reissue the two-byte request. This re-request cycle may continue for up to three minutes (or a number of attempts), after which the effort may be abandoned.

In some embodiments, the ICU may know which block number to expect next during the download process. If the wrong block appears it may be ignored and the proper one re-requested. In some embodiments, the OTAP server does not queue requests, but instead responds to the latest received request.

In some embodiments, when an OTAP download is abandoned the existing operating code may resume operation. In some embodiments, the ICU may reschedule itself to resume the download at the same time the next day. The ICU server may also reschedule a download in some embodiments. The download may resume from the last block number successfully received in some embodiments.

In some embodiments, if an OTAP process comes within five minutes of the start time for a watering operation, the process may be stopped to allow the watering to proceed. The download may then resume with the next desired block (similar to resuming a download after an OTAP was abandoned as previously described).

In some embodiments, the administrator may schedule when to download firmware and what firmware to download. This procedure may be prone to error, e.g., downloading an incompatible software type to an ICU. Such a mistake may require on-site or factory reprogramming to recover, and could even damage the ICU's microprocessor if programming is attempted to some non-flash-memory locations. Some embodiments avoid this cross-programming internally by identifying each candidate file with a "family ID" as discussed above. After the code is downloaded to the EEPROM, its family ID may be extracted from the EEPROM and compared with the existing code's family ID on the ICU. If the IDs differ an event may be sent to the OTAP server and the download may be abandoned.

Example Graphical User Interfaces

Figure 9:
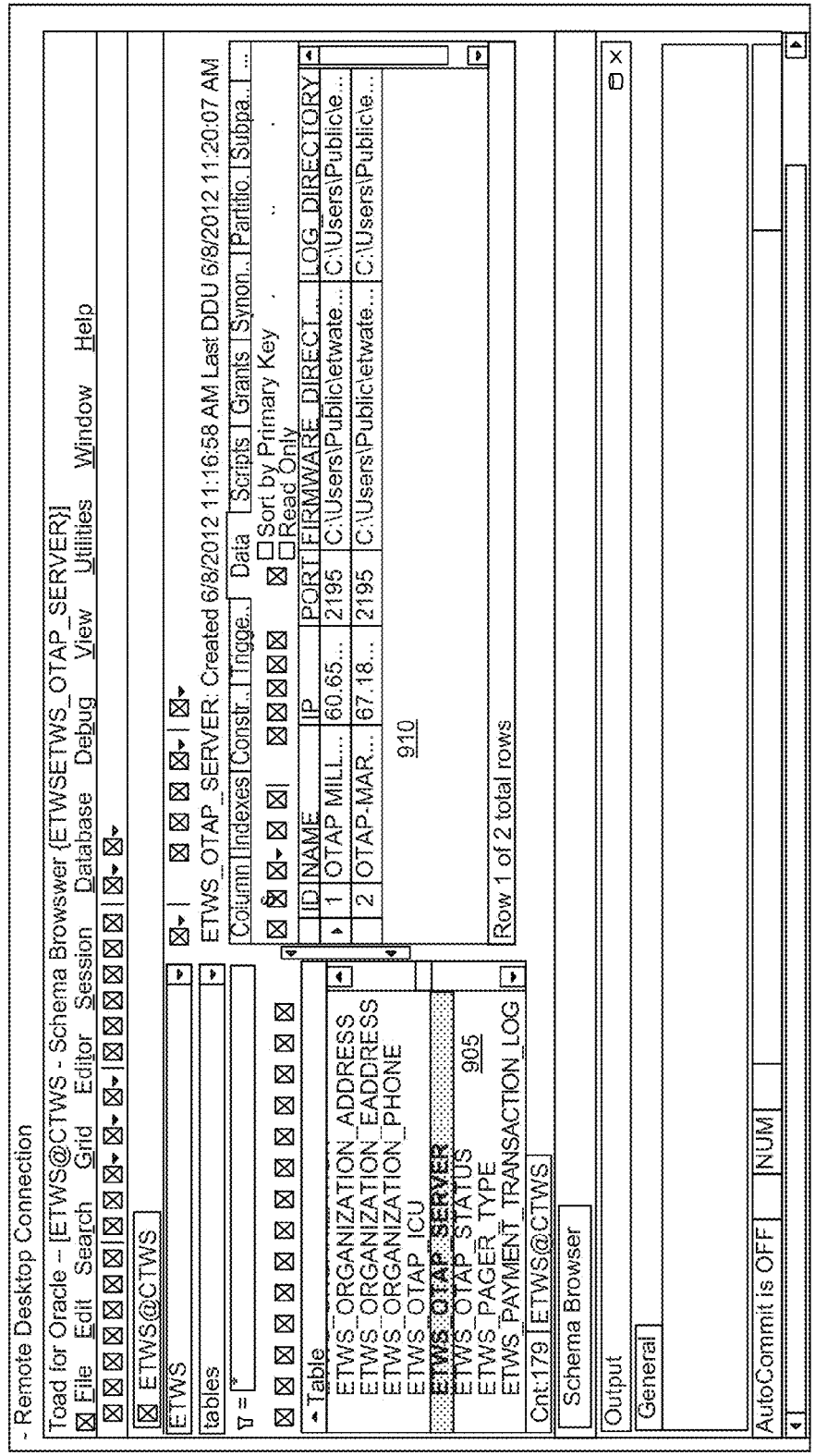
FIG. 9 is a screenshot of a graphical user interface for managing firmware versions on Over the Air Programming (OTAP) servers as may be implemented in some embodiments.

FIG. 9 is a screenshot of a graphical user interface 900 for managing firmware versions on Over the Air Programming (OTAP) servers as may be implemented in some embodiments. Particularly, the screen 900 shows a set up for two OTAP Servers. A first selection region 905 may be used to select the software for download. A second selection region 910 may be used to indicate the servers for which the software is to apply.

In some embodiments, there is only one "master" OTAP server and all others are slaves. The server with the highest numbered ID may be chosen as the master OTAP server in some embodiments.

In some embodiments, after configuring the servers in the database, an administrator may specify a network "hole" in their router for the UDP port of the OTAP Server and another hole for the TCP port 80 for the OTAP-admin webpages to be served. The server behind the router firewall may have a fixed IP address. This may mean that the IP address may be assigned from a range of address that does not come out of the router's DHCP address pool.

Figure 10:
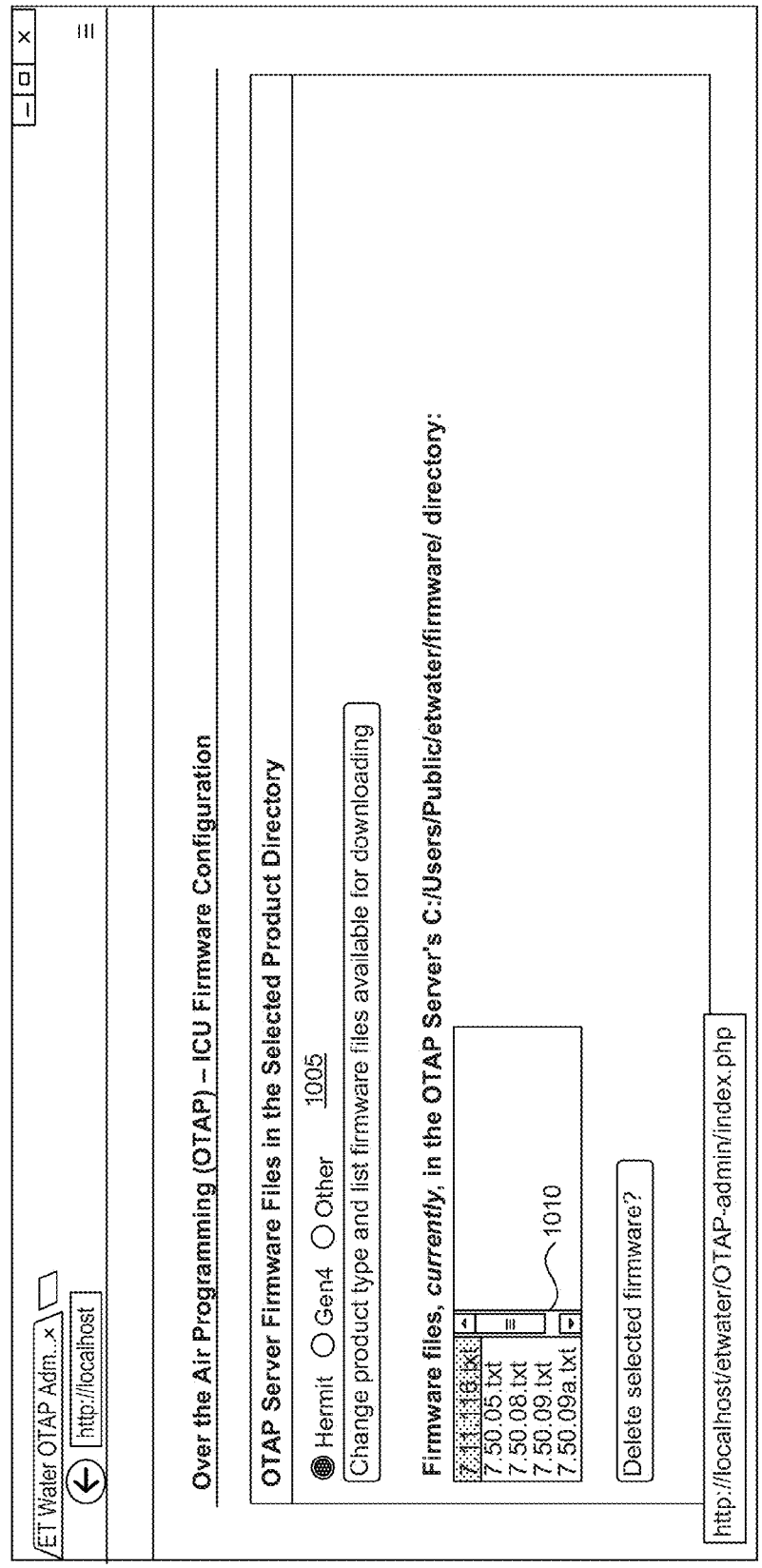
FIG. 10 is a screenshot of a graphical user interface for performing a web administration set up procedure on an OTAP server as may be implemented in some embodiments.

FIG. 10 is a screenshot of a graphical user interface 1000 for performing a web administration set up procedure on an OTAP server as may be implemented in some embodiments. A first selector 1005 may allow a user to identify the device for which a software/firmware update is desired. The update itself may be selected at selector 1010. In some embodiments the web interface is generated via a combination of the Apache Web server with PHP, CSS and HTML functionality. The radio buttons of selector 1005 may be used to select the product type. This may allow the administrator to view and select the firmware files for a particular product.

Figure 11:
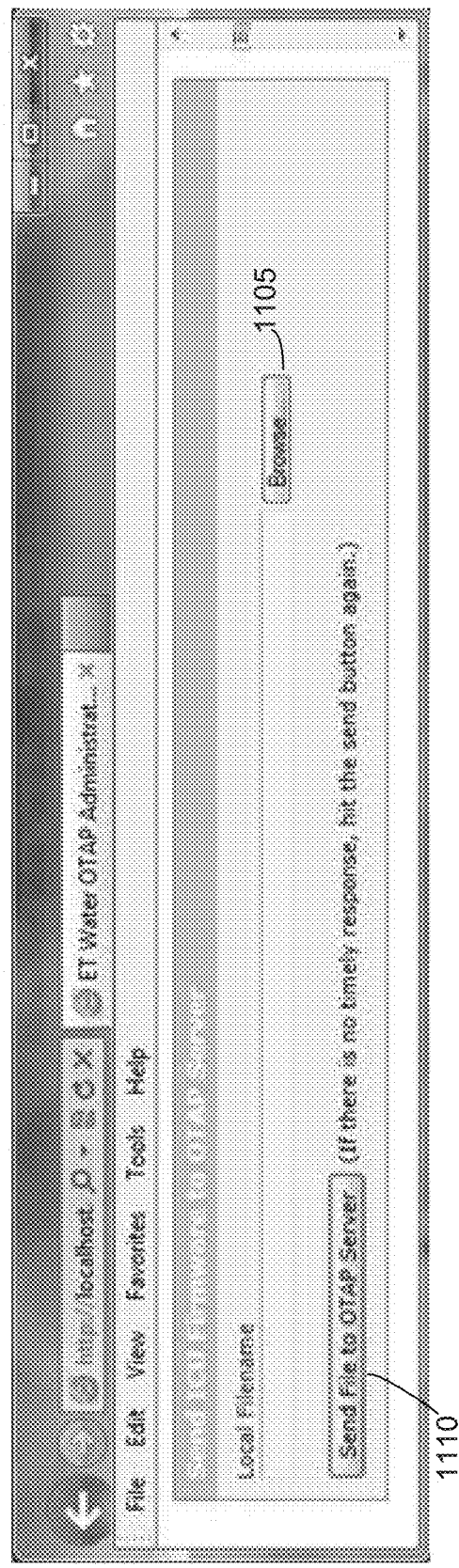
FIG. 11 is a screenshot of a graphical user interface for sending firmware to an OTAP server as may be implemented in some embodiments.

FIG. 11 is a screenshot of a graphical user interface for sending firmware to an OTAP server as may be implemented in some embodiments. The user may select a file via selector 1105 and upload the file via submission button 1110.

In some embodiments, the "browse" button may be used to select the file from an administrator's local PC and directory that contains the firmware they wish to upload to the OTAP-Server. The "Send File to OTAP Server" button may then be used to transfer the file from the local PC to the OTAP Server. If the firmware is already recorded in the database then the system may replace the old with the new, retain the old, or retain both.

Figure 12:
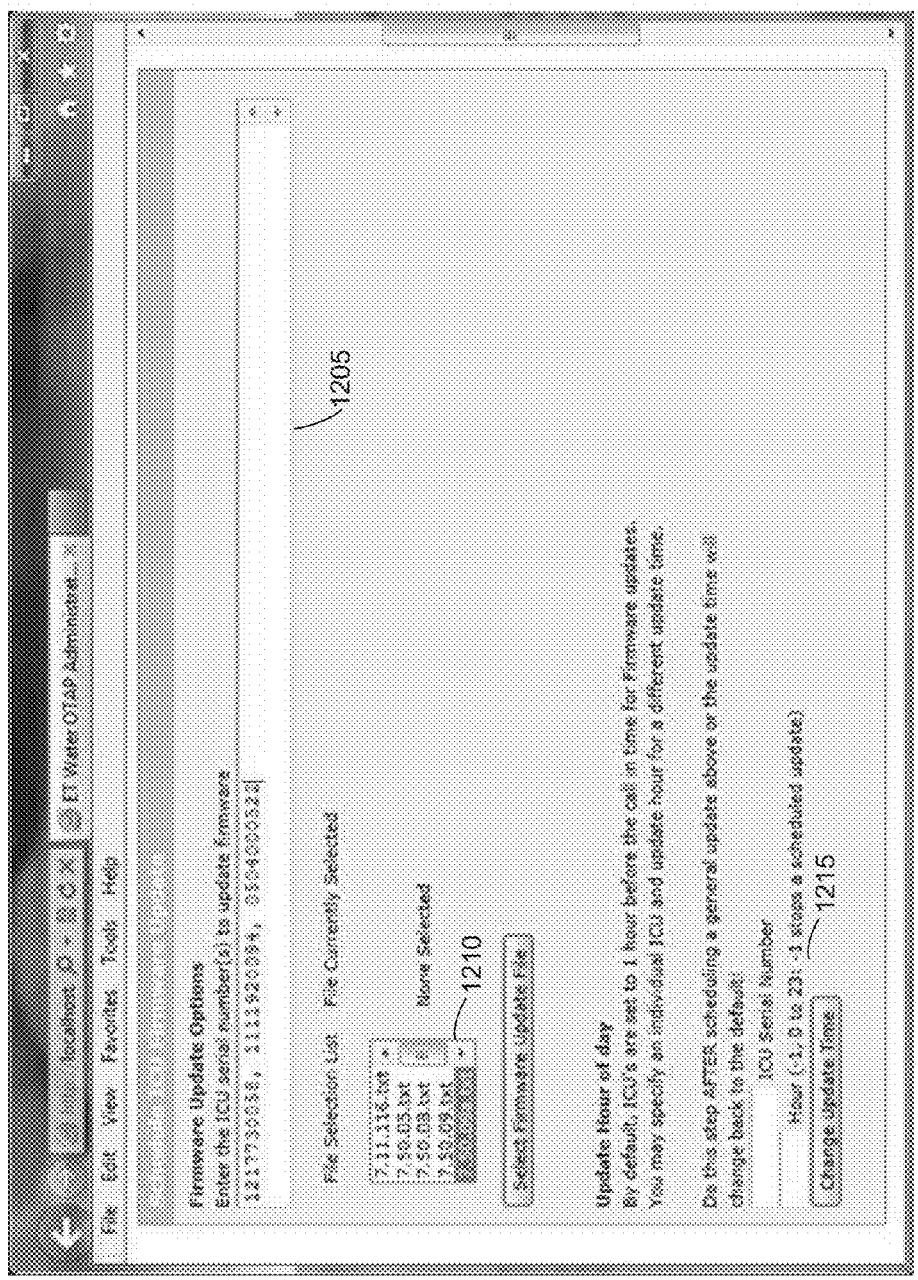
FIG. 12 is a screenshot of a graphical user interface for scheduling an ICU firmware update from an OTAP server as may be implemented in some embodiments.
Figure 13:
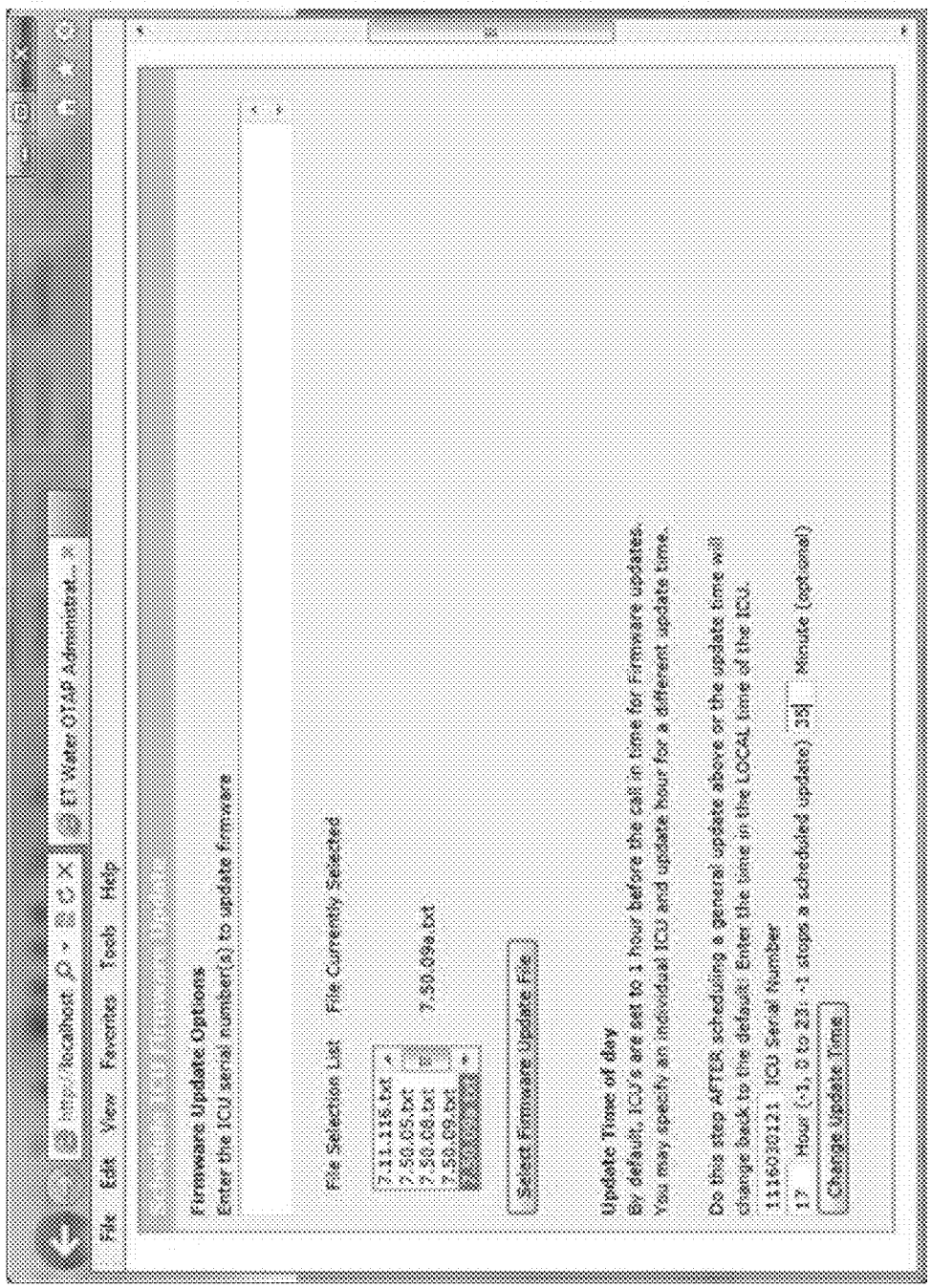
FIG. 13 is a screenshot of a graphical user interface for scheduling a firmware update from an OTAP server with various example values filled in as may be implemented in some embodiments.

FIG. 12 is a screenshot of a graphical user interface for scheduling an ICU firmware update from an OTAP server as may be implemented in some embodiments. The ICUs to be updated may be specified by serial number in an input 1205. The firmware/software files to be downloaded may be selected at input 1210. Update times for the respective ICUs may be specified at input 1215. FIG. 13 is a screenshot of a graphical user interface for scheduling a firmware update from an OTAP server with various example values filled in as may be implemented in some embodiments.

As depicted in FIGS. 12 and 13 an administrator may schedule a firmware transfer between the ICU and the OTAP Server. The administrator may enter the ICU serial number or serial numbers of the ICUs that shall receive the same software. The administrator may click on the "Select Firmware Update File". In this example, the time that the ICU calls the OTAP Server is called "Minutes to Call". In some embodiments, to stop a firmware update while the Status is in the "Start of Update" state an administrator may set the hours of "minutes to call" to −1. In some embodiments, by default, the "Minutes to Call" is scheduled one hour before the ICU to ICU Server call in time. This may also be four hours before the start of the window for watering operations. This time may be set in the ICU and may be in the local time zone of the ICU. In the example of FIG. 13 the ICU serial number 1116030121 may be rescheduled for 5:35 PM.

Figure 14:
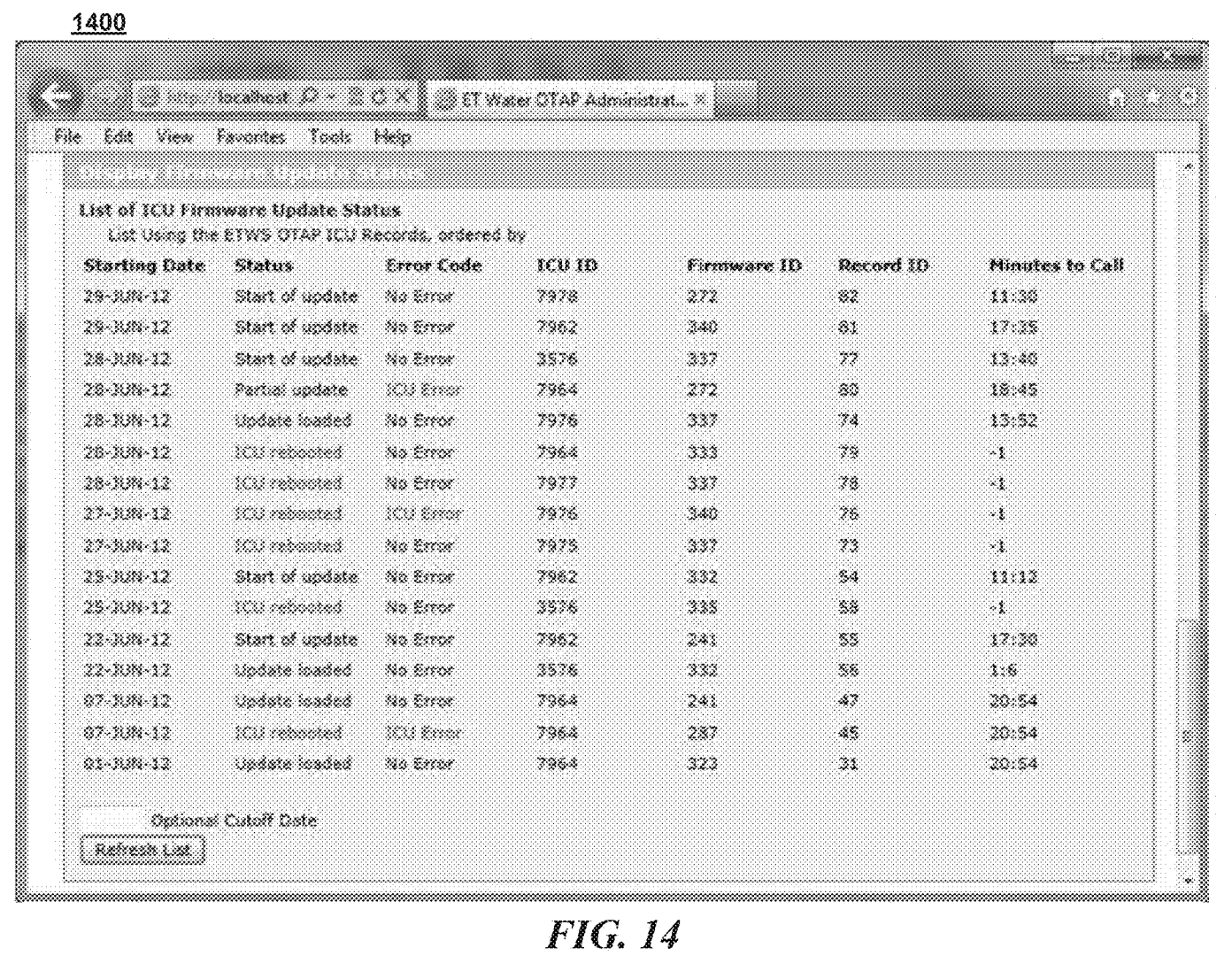

FIG. 14 is a screenshot of a graphical user interface for monitoring firmware update status at an OTAP server as may be implemented in some embodiments. As indicated, the interface 1400 may depict a starting date for an update event, the status, error code if relevant, ICU ID, firmware ID (e.g. indicating the version), the record ID, and minutes remaining until the update is performed.

In the depicted example, the list contains all of the ICU firmware upgrades, past, present and future. The list may be sorted by the earliest starting date of a scheduled firmware transfer. It may then be sorted by the least advanced firmware transfer statuses. Next it may be sorted by the ID of the database record. Then it may be sorted by the error code type and the highest numbered ICU. Such information may be stored in a SQL database, XML file, or the like as readily understood in the art.

OTAP Status Indicators

FIG. 15 is a table 1500 depicting example OTAP status indicator relations as may be implemented in some embodiments. One will readily understand that these relations are merely for purposes of explanation and that alternatives will readily exist.

Because the firmware upload may be a multi-step process, in some embodiments there is a state variable that tracks the progress of the firmware upload. This variable may be associated with the specific ICU and firmware combination. The variable may be called "status".

Computer System

Figure 16:
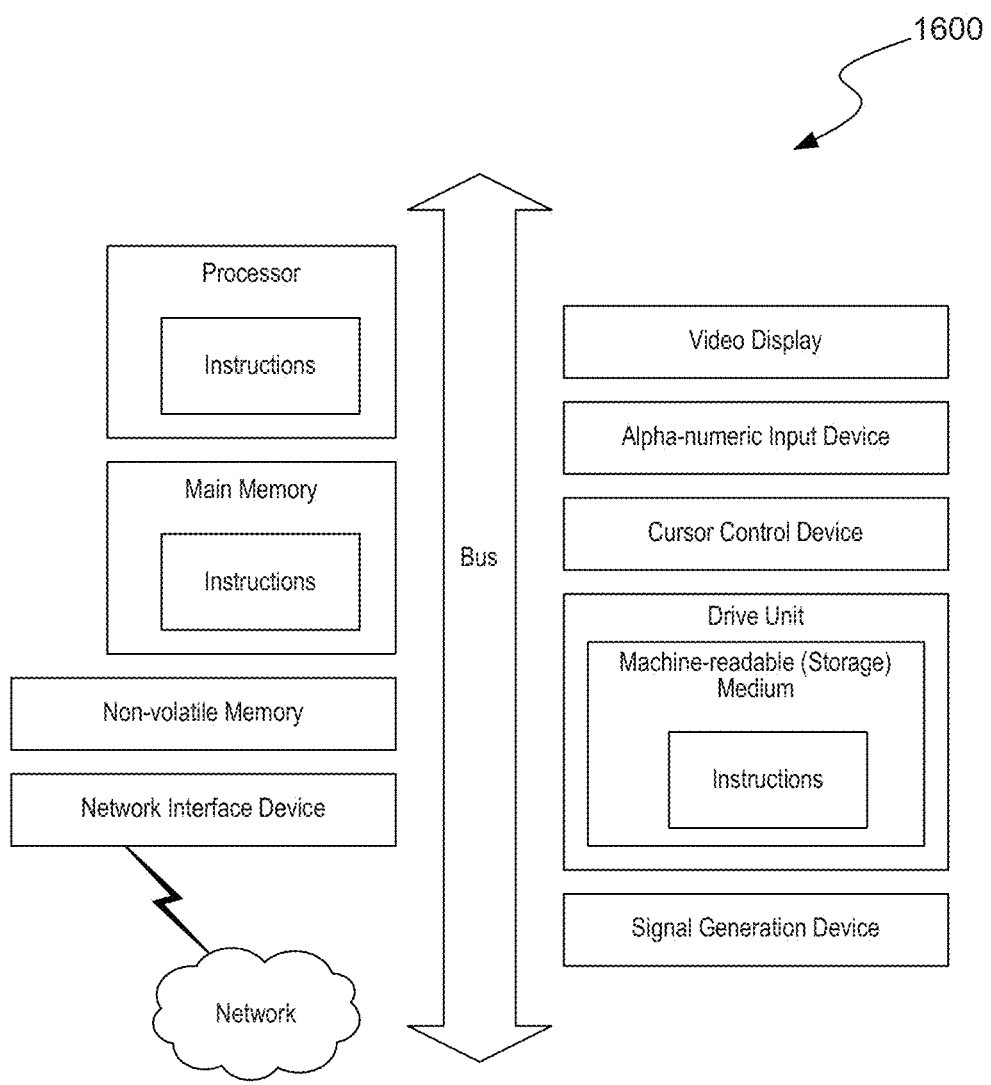
FIG. 16 shows a diagrammatic representation of a machine in the example form of a computer system within which a set of instructions for causing the machine to perform any one or more of the methodologies discussed herein may be executed.

FIG. 16 shows a diagrammatic representation of a machine 1600 in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1600 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. he firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Remarks

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMs), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only some aspects of the disclosure may be recited as a means-plus-function claim under 35 U.S.C. §112(f), other aspects may likewise be embodied as a means-plus-function claim, or in other forms, such as being embodied in a computer-readable medium. (Any claims intended to be treated under 35 U.S.C. §112(f) will begin with the words "means for".) Accordingly, the applicant reserves the right to add additional claims after filing the application to pursue such additional claim forms for other aspects of the disclosure.

What is claimed is:

1. An irrigation control unit (ICU), comprising:
    at least one interface configured to control at least one water distribution element;
    at least one network interface;
    at least one processor;
    a first memory; and
    a second memory comprising:
        a boot portion comprising a first family ID value;
        instructions executable by the at least one processor to:
            receive, from a first server address via the at least one network interface, a time and a second server address to request a software update;
            request a data block associated with the software update based upon a block number associated with the block;
            receive the data block, a first error code, and a second family ID value from the second server address via the at least one network interface;
            determine that the first family ID value and second family ID value are the same;
            confirm an integrity of the data block based upon the first error code;
            generate a second error code based upon the data block;
            store the data block in the first memory;
            confirm the integrity of the data block as stored in the first memory based upon the second error code;
            generate a third error code based upon a plurality of data blocks stored in the first memory, the plurality of data blocks including the first data block;
            confirm the integrity of the plurality of data blocks based upon the third error code;
            store a plurality of configuration parameters to the second memory;
            transfer a portion of contents of the first memory to the second memory, the portion comprising the data block as stored in the first memory; and
            restart the ICU based in part upon the boot portion.

2. The ICU of claim 1, wherein the second memory comprises a watering schedule.

3. The ICU of claim 1, wherein the first error code, the second error code, and the third error code are cyclic redundancy checks.

4. The ICU of claim 1, the instructions further executable by the at least one processor to:
    create an event based upon at least one of the first error code, the second error code; and the third error code.

5. The ICU of claim 4, the instructions further executable by the at least one processor to:
    transmit the event to a server.

6. An irrigation control unit (ICU), comprising:
    at least one interface configured to control a water distribution element;
    at least one processor;
    a first memory; and
    a second memory comprising instructions executable by the at least one processor to:
        receive a data block and a first error code from a server;
        confirm an integrity of the data block based upon the first code;
        store the data block in the first memory;
        transfer the contents of the first memory to the second memory;
        create a first event based on the first error code received from the server;
        generate a second error code based on a directory;
        generate a third error code based on a binary code in the first memory;
        create a second event based on the second error code;
        create a third event based on the third error code; and
        restart the ICU.

7. The ICU of claim 6, the instructions further executable by the at least one processor to:
    transmit at least one of the first event, the second event, and the third event to the server.

8. The ICU of claim 6, the instructions further executable by the at least one processor to:
    receive a time to request a download; and
    request the data block from the server at the time to request prior to receiving the data block from the server.

9. The ICU of claim 6, wherein storing the data block in a first memory comprises storing the data block in a directory in the first memory, wherein the directory comprises a first address entry and a second address entry, wherein the first address entry comprises the beginning of the block in the first memory and the second address entry comprises the beginning of the block in the second memory.

10. The ICU of claim 6, wherein the ICU comprises a first family code at a fixed location in a boot sector and the data block comprises a second family code, the method further comprising verifying that the first family code of the boot sector and the second family code of the data block are consistent.

11. The ICU of claim 10, wherein the boot sector comprises all operating code needed to interpret a directory in the first memory, to burn the contents of the first memory into the second memory according to the directory, and to restart the system.

\* \* \* \* \*